United States Patent
Brandt et al.

(10) Patent No.: US 8,850,593 B2
(45) Date of Patent: Sep. 30, 2014

(54) DATA MANAGEMENT USING A VIRTUAL MACHINE-DATA IMAGE

(75) Inventors: Marc Brandt, Eybens (FR); Fred A. Cummins, Pinckney, MI (US); Siani Pearson, Monmouthshire (GB); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 375 days.

(21) Appl. No.: 13/106,719

(22) Filed: May 12, 2011

(65) Prior Publication Data

US 2012/0290850 A1    Nov. 15, 2012

(51) Int. Cl.
- *G06F 7/04* (2006.01)
- *G06F 21/62* (2013.01)
- *G06F 21/57* (2013.01)

(52) U.S. Cl.
CPC .... *G06F 21/6218* (2013.01); *G06F 2221/2141* (2013.01); *G06F 21/575* (2013.01)
USPC .............................................. 726/26; 726/15

(58) Field of Classification Search
USPC ...................................................... 726/15, 26
See application file for complete search history.

(56) References Cited

U.S. PATENT DOCUMENTS

| | | | |
|---|---|---|---|
| 7,516,331 B2 | 4/2009 | Jin et al. | |
| 2008/0307409 A1 | 12/2008 | Lu et al. | |
| 2009/0300719 A1 | 12/2009 | Ferris | |
| 2010/0071025 A1 | 3/2010 | Devine et al. | |
| 2011/0197285 A1* | 8/2011 | Ginter et al. | 726/27 |
| 2011/0202916 A1* | 8/2011 | VoBa et al. | 718/1 |
| 2011/0238820 A1* | 9/2011 | Matsuoka | 709/224 |
| 2011/0302400 A1* | 12/2011 | Maino et al. | 713/2 |

FOREIGN PATENT DOCUMENTS

KR    20090058184    6/2009

OTHER PUBLICATIONS

Jun Li, Bryan Stephenson, Hamid R. Motahari-Nezhad and Sharad Singhal, Geodac: A Data Assurance Policy Specification and Enforcement Framework for Outsourced Services, Service Computing, IEEE Transactions, pp. 1-1, Dec. 23, 2010.

* cited by examiner

*Primary Examiner* — Christopher Brown

(57) ABSTRACT

In one implementation, encrypted data and a virtual machine are stored together as a virtual machine-data image, wherein the virtual machine is configured to EXERT management control over the data based on policies set by an owner of the data. In another implementation, metadata defining or tagging policies for usage of data is associated with the data. Control capabilities of service providers are mapped to the policies, wherein those service provider environments that best satisfy the controls mapped to the policies are identified.

12 Claims, 3 Drawing Sheets

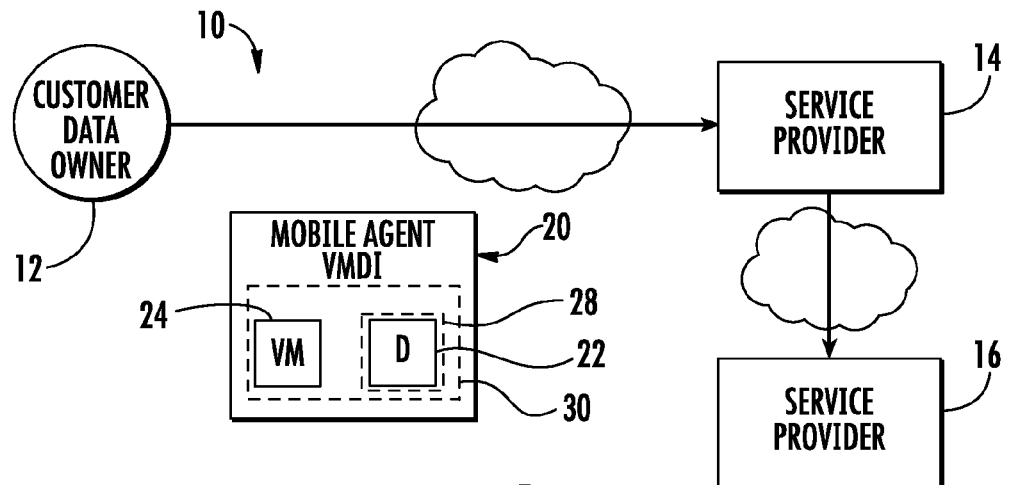
FIG. 1
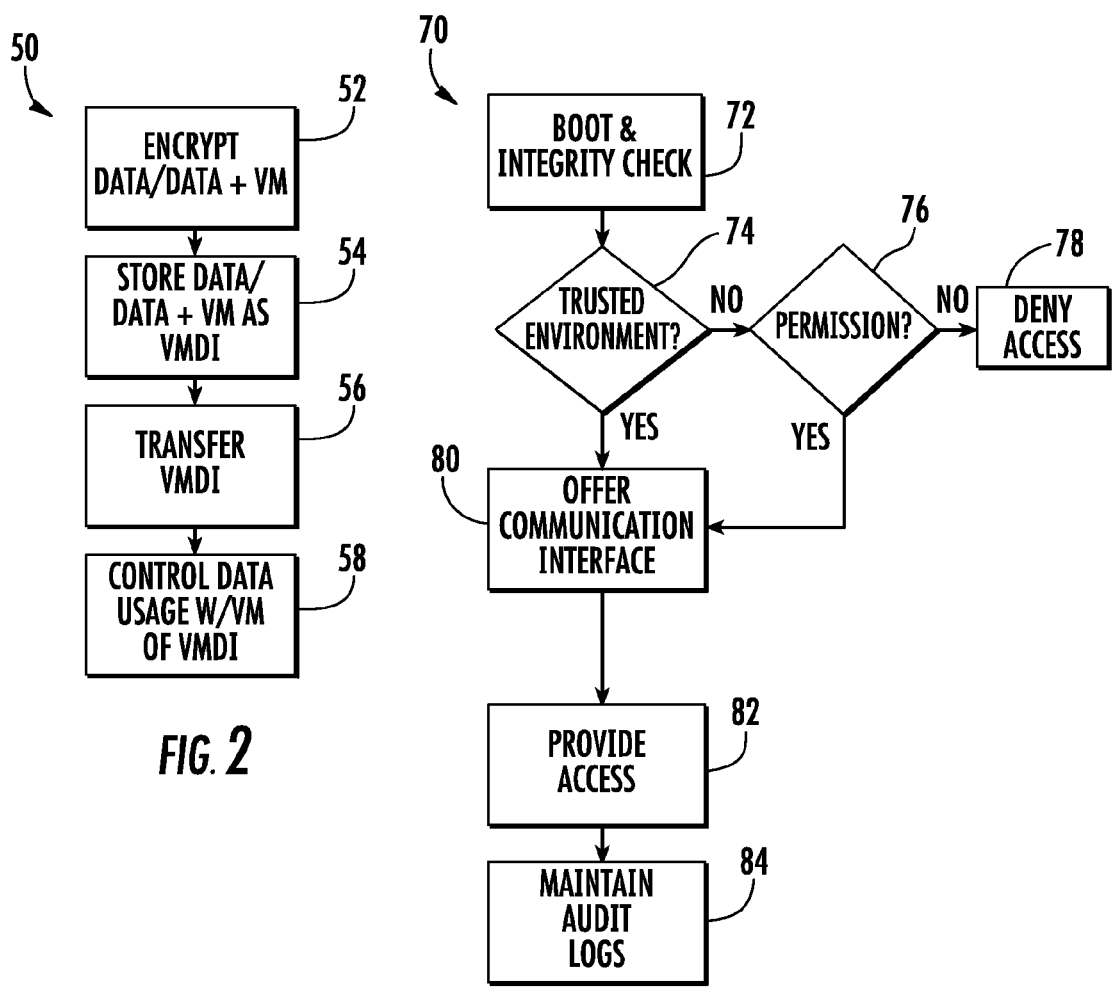
FIG. 2
FIG. 3

DATA MANAGEMENT USING A VIRTUAL MACHINE-DATA IMAGE

BACKGROUND

In some circumstances, such as cloud computing environments, data may be transferred to and transported between service providers. Maintaining reliable and cost-effective control and security over such data may be difficult. Applying the same level of control and security over all data at a service provider may not be cost-effective. Maintaining control and security over data being transported from one service provider to another service provider may be challenging.

BRIEF DESCRIPTION OF THE DRAWINGS

FIG. 1 is a schematic illustration of a data management system according to an example implementation.

FIG. 2 is a flow diagram of a method for creating and transmitting data to be managed according to an example implementation.

FIG. 3 is a flow diagram of a method for managing the data according to an example implementation.

DETAILED DESCRIPTION

Figure 4:
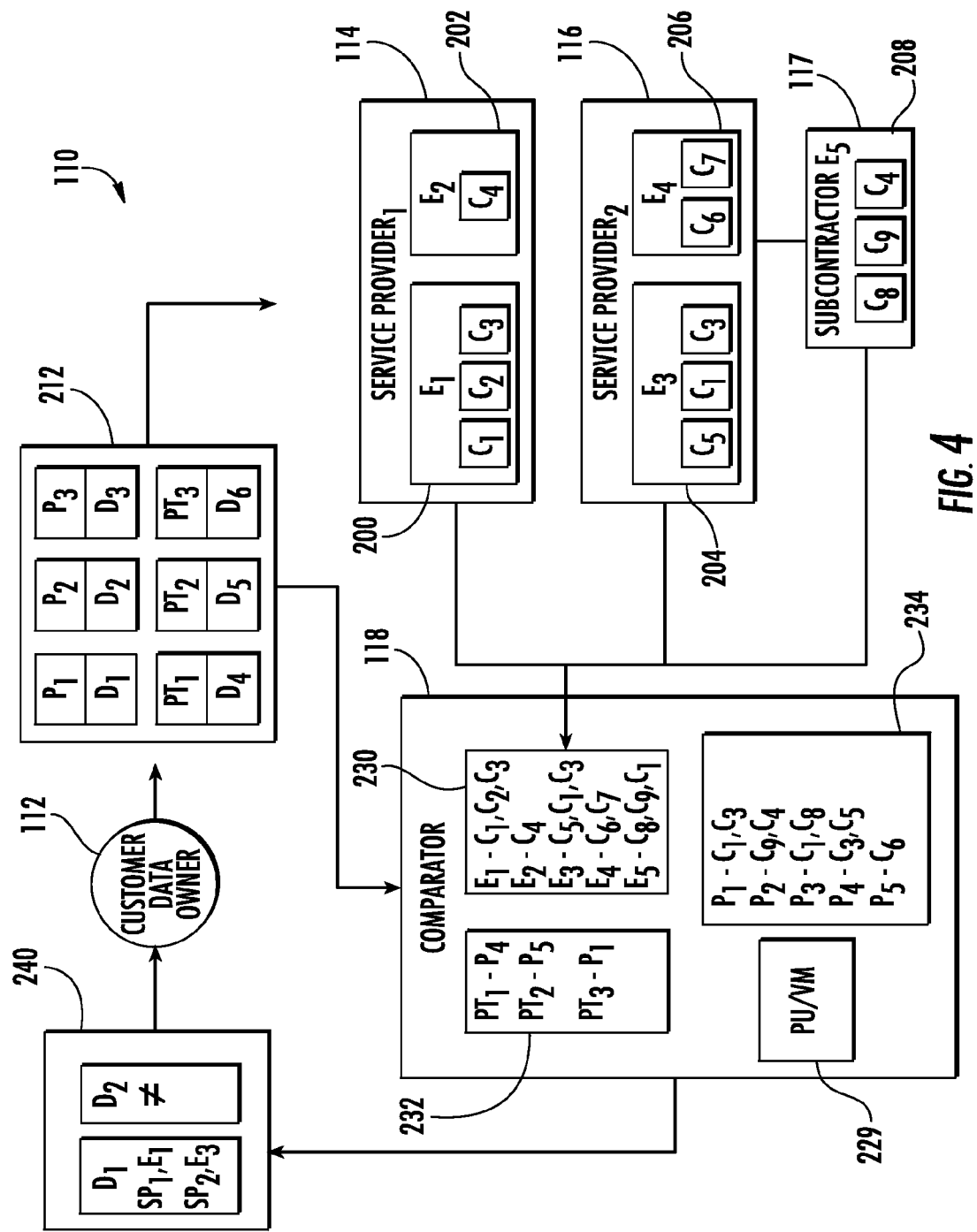
FIG. 4 is a schematic illustration of another implementation of the data management system of FIG. 1 according to an example implementation.

FIG. 1 schematically illustrates a data management system 10 according to an example implementation. As will be described hereafter, data management system 10 facilitates control and security over data as the data is being transported to a service provider or from one service provider to another. Data management system 10 comprises a customer or data owner 12 and service providers 14, 16.

Data owner 12 may be the creator of data or an entity authorized to use data. Service providers 14, 16 are in communication with one another and in communication with the customer data owner 12. Service providers 14, 16 operate in cloud computing environments. "Cloud computing" refers to the provision of computational resources on demand via a computer network. In cloud computing, a local computer may contain almost no software or data (perhaps a minimal operating system and web browser only), serving as little more than a display terminal for processes occurring on a network of remote computers.

As further shown by FIG. 1, data management system 10 involves the transfer of a mobile agent 20 from customer 12 to service provider 14 and/or from service provider 14 to service provider 16. Mobile agent 20 comprises a single self-contained virtual machine-data image which comprises both data 22 and virtual machine 24. Data 22 comprises information that is to be securely managed and controlled, wherein access to, transportation of and/or use of the data is limited.

Virtual machine 24 comprises a software emulation of a programmable machine or computer that executes programs like a physical machine. In one implementation, virtual machine 24 comprises a process virtual machine designed to run one or more programs or applications. Virtual machine 24 is configured to exert management control over data 22. Management control pertains to, not altering the data itself, but controlling or managing access to or use of data 22.

As shown by broken lines 28, in one implementation, data 22 may itself be encrypted, whereas virtual machine 24 remains unencrypted as part of mobile agent 20. As indicated by broken lines 30, in another implementation, both data 22 and virtual machine 24 may be encrypted as part of mobile agent 20. Because data 22 is encapsulated with virtual machine 24 as part of a virtual machine-data image, system 10 facilitates migration of such data 22 between different administrative entities while better ensuring compliance with regulatory or enterprise policies pertaining to data access and data use audits. Because data 22 is moved as part of an image also containing the virtual machine 24 providing controls for access to the data 22, the data and associated controls can be migrated as appropriate, like a file.

In some implementations, the image may itself include encryption keys. In other implementations, the image may be provided with the unique identifier identity and the management software provided by virtual machine 24 may request secure communication back to the data owner 12 as part of the boot up sequence to obtain decryption keys rather than storing them as part of the image. As a result, the ability of someone to examine the image of virtual machine 24 to retrieve encryption keys or tamper with audit logs may be reduced.

FIG. 2 is a flow diagram 50 of an example process carried out by the customer or data owner 12 when the customer or data owner 12 desires to transport or transfer data to a service provider 14. As indicated by block 52, customer 12 initially encrypts data 22, by itself, or data 22 and virtual machine 24 together. In those implementations where the entire image (both virtual machine 24 and data 22) are encrypted, a higher degree of security may be provided since the image may be less susceptible to hacking by examining image content without running the image as a virtual machine. As indicated by block 54, customer 12 stores the encrypted data and the virtual machine (encrypted or not) as a single mobile agent comprising a virtual machine-data image. As indicated by block 56, the virtual machine data image serving as mobile agent 20 is then transferred in a wired or wireless fashion to service provider 14 in a cloud computing environment. As indicated by block 58, service provider 14 controls data usage using the virtual machine of the virtual machine data image. In particular, service provider 14 controls access to data 22 using programs or controls provided by virtual machine 24. In one implementation, service provider 14 may also conduct data usage audits using controls provided by virtual machine 24. In still other implementations, service provider 14 may satisfy other data security or sensitivity policies using controls provided by virtual machine 24.

Should customer 12 or service provider 14 wish to have the data transferred to a different service provider, such as service provider 16, data 22 may be subsequently transferred or transmitted to service provider 16 as part of the same mobile agent 20. Because virtual machine 24 and data 22 are encapsulated together as a single mobile agent 20, security management of data 22 remains uniform and consistent between service provider 14 and service provider 16, and is not compromised. In other words, access to and usage of data 22 at service provider 16 will include at least the same safeguards and satisfy the same policies as were enforced while the data was being used and accessed at service provider 14.

FIG. 3 is a flow diagram of an example process or method 70 performed by a recipient (service provider 14 or service provider 16) of mobile agent 20 using the controls for data 22 provided in virtual machine 24. As indicated by block 72, the operating system is booted up and virtual machine 24 initiates an integrity check. If the entire image of mobile agent 20 is encrypted (both virtual machine 24 and data 22 are encrypted as identified by broken lines 30 in FIG. 1), virtual machine 24 may include a specialized boot loader for both an integrity check and the operating system boot. If virtual machine 24 is not encrypted, whereas data 22 is encrypted, service provider 14 may perform an operating system boot as usual, wherein virtual machine 24 subsequently manages the encrypted data. The integrity check performed by virtual machine 24 verifies the integrity of data 22, attempting to ensure that data 22 has not been altered, compromised or corrupted.

In one implementation, virtual machine 24 may provide management software that offers a file server interface which allows virtual machine 24 and the associated data 22 of the image to be booted up in any service provider customer environment and transported. As a result, when virtual machine 24 is booted, virtual machine 24 may be treated as a network attached storage by other servers or clients on a network.

As indicated by step or block 74, virtual machine 24 may determine whether virtual machine is running in a trusted environment. In other words, virtual machine 24 determines whether a request to access data 22 is authorized. Such authorization may be provided to the use of encryption, passwords and other security measures. In one implementation, virtual machine 24 may utilize a trusted platform module (TPM) which includes facilities for the secure generation of cryptographic keys, limitations of their use, and a hardware pseudo-random number generator. Such a trusted platform module may also include capability such as remote attestation and sealed storage.

As indicated by step 76, if virtual machine 24 determines that virtual machine 24 is not currently running in a trusted environment, improper passwords or a currently unauthorized attempt to access data is taking place, virtual machine 24 may contact the customer or owner of data 22 to notify the customer 12 of the unauthorized access attempt and to possibly request a waiver or permission. As indicated by step 78, if permission is denied, access to data 22 is denied. Such access can be denied before any data 22 is decrypted.

As indicated by block or step 80, if virtual machine 24 determines that virtual machine 24 is running in a trusted environment (per step 74) or if the customer or owner 12 has granted permission despite a lack of authorization credentials from the requester (step 76), virtual machine 24 offers a single set of communication interfaces for access to data 22. Virtual machine 24 prevents access to data 22 except through such defined interfaces.

As indicated by block or step 82, virtual machine 24 provides access to data 22 through the defined communication interfaces. As indicated by block or step 84, virtual machine 24 may further create and maintain audit logs as well as policy commands for external use and configuration. Such audit logs 84 serve as logs indicating compliance with security policies and procedures as well as logs of access to data 22.

FIG. 4 schematically illustrates data management system 110 according to an example implementation. As with data management system 10, data management system 110 facilitates control and security over data as the data is being transported to a service provider or from one service provider to another in a cloud computing environment. Data management system 110 comprises a customer or data owner 112, service providers 114, 116, service subcontractor 117 and comparator 118.

Data owner 112 may be the creator of data or an entity authorized to use data. Service providers 114, 116 are in communication with one another and in communication with the customer data owner 112. Service providers 114, 116 operate in cloud computing environments. As shown by FIG. 4, service provider 114 includes different virtual environments as compared to service provider 116. In the example illustrated, each of service providers 114, 116 includes multiple distinct virtual environments. In other implementations, a service provider may offer a single virtual environment. In the specific example illustrated, service provider 114 includes virtual environments 200, 202. Service provider 116 includes virtual environment 204 and 206.

Virtual environments 200-206 comprise distinct virtual environment having distinct sets of controls. Controls comprise software or hardware computer programs which control or manage data. Such controls may relate to security of the data by controlling or limiting access to the data to authorized individuals, may limit the extent to which data may be accessed or used, may limit the extent to which data may be transported and may create or maintain audit logs that record compliance with security policies or record access or security events associated with data. In the example illustrated, environment 200 includes controls C1, C2 and C3. Environment 202 includes controls C4. Environment 204 includes controls C1, C3 and C5 (two of the controls are identical to the controls contained environment 200). Environment 206 includes controls C6 and C7.

Subcontractor 117 comprises an entity offering an additional virtual environment 208 having a different set of controls. Subcontractor 117 offers virtual environment 208 for use by service providers 114, 116 to satisfy the policies associated with the data being stored or used by such service providers 114, 116. In the example illustrated, subcontractor 117 includes controls C1, C8 and C9 (the controls C1 being identical to the controls provided in environments 200 and 204).

As shown by FIG. 4, service providers 114 and 116, operating in a cloud environment, receive blocks of data, such as data block 212, from customer 112. Data block 212 includes multiple sets of data D, each data set associated with a unique or different data management policy P. Although FIG. 4 illustrates the different sets of data D and their associated policies P coming from a single customer 112, such different sets of data D and associated policies P may be provided by multiple different customers or data owners 112. Policies may be associated with different data sets either directly or indirectly. In the example illustrated, data block 212 includes data sets D1-D6. Data sets D1-D3 have associated metadata which directly associates policies P1-P3 with data sets D1-D3, respectively. Data sets D4-D6 each have metadata identifying policy tags PT1-PT3, respectively. Policy tags PT (also known as linked references) link or are tied to the actual policies which are more detailed and which are expressed separately. In some implementations, the metadata may include actual controls for the associated data.

Figure 5:
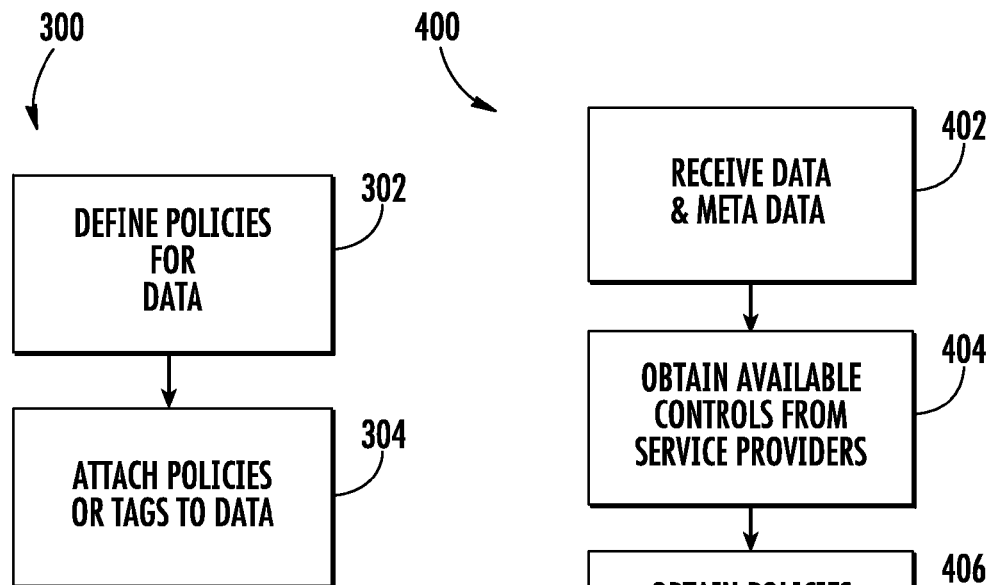
FIG. 5 is a flow diagram of a method for creating and attaching metadata prescribing management policies to data.

FIG. 5 illustrates one example process or method 300 for the creation of the data sets of data block 212. As indicated by step or block 302, the customer 112 first defines policies for data sets D1-D6. Examples of such policies may be who or what entities have access to the associated data or data sets, to what extent are such entities entitled to use the data or data sets or modify the data of the data sets, how such data is to be stored or maintained, what audits, records or logs must be created or maintained regarding access to and usage of the data sets and the like.

As indicated by step or block 304, customer or data owner 112 attaches the defined policies or tags to the data as metadata. Some of the defined policies may be directly included in the metadata and directly attached to the data sets such as with data sets D1-D3. Other policies may be identified or tagged using policy tags PT, such as tags PT1-PT3. Such policy tags PT are included in the metadata and identify or address the actual policies which are stored or provided externally. Once created, the data block 212 with each of the data sets and associated metadata is transmitted to comparator 118 (shown in FIG. 4).

Comparator 118 comprises one or more processing units or virtual machines 229 configured to follow instructions contained in hardware or software stored in an associated memory, wherein the one or more processing units/virtual machines, following such instructions, (1) receive the data sets of data block 212; (2) retrieves, receives or maintains policy tag indices or definitions; (3) retrieves, receives and/or stores information regarding the controls C offered by different virtual environments 200, 202, 204 and 206 of different service providers; (4) maps one or more controls for satisfying the policies to the defined policies in the data sets; (5) compares the control capabilities of the virtual environments offered by the various service providers to the controls that have been mapped to the defined policies; and (6) identifies those service provider environments that best satisfy the controls mapped to the policies based upon the comparisons. The customer or data owner 112 may then use the information to determine which service provider virtual environments best satisfy the owner's policy requirements for the data sets.

A "processing unit" may be a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other implementations, hard wired circuitry may be used in place of or in combination with software instructions to implement the functions described. For example, comparator 118 may be embodied as part of one or more application-specific integrated circuits (ASICs). Unless otherwise specifically noted, the controller is not limited to any specific combination of hardware circuitry and software, nor to any particular source for the instructions executed by the processing unit.

As shown by FIG. 4, in addition to the one or more processing units/virtual machines 229 and one or more associated memories (not shown) including instructions for one or more processing units 229, comparator 118 comprises portions of a persistent memory or memory storage device that include a mapping 230 of service provider virtual environments E to the controls C provided in each environment, a mapping 232 of policy tags PT to the associated policies P; and a mapping 234 of the defined policies P to those controls C which satisfy the corresponding policies P. Mapping 230 may comprise a lookup table, index, chart or other computer readable data storage which identifies the controls C in each of the virtual environments E offered by the various service providers 114, 116. In the example illustrated, mapping 230 is provided in a memory of comparator 118. In such an implementation, comparator 118 may retrieve information regarding what controls are provided in each of the virtual environments E. For example, comparator 118 may access and retrieve such information via a website or other publication by the service provider or others. In another implementation, comparator 118 may receive, such as through an input device, such information. In other implementations, mapping 230 may be provided in persistent memory storage device associated with the one or more service providers 114, 116 or at another external location.

Mapping 232 may comprise a lookup table, index, chart or other computer readable storage which identifies what full data policies are being identified with individual policy tags. In one implementation, mapping may be provided in a memory of comparator 230. In another implementation, mapping 232 may be provided in a memory external to comparator 118, such as at customer 112 or at a third external location or broker, wherein comparator 118 retrieves information from mapping 232.

Mapping 234 may comprise a lookup table, index, or chart of the computer readable storage which identifies what controls will satisfy particular policies. In one implementation, comparator 118 may itself make such determinations. In another implementation, comparator 118 may receive or retrieve information identifying what controls satisfy particular policies P. In one implementation, mapping 234 may be provided in a memory of comparator 230. In another implementation, mapping 234 may be provided in a memory external to comparator 118, such as at customer 112, at service providers 114, 116 or at a third external location or broker, wherein comparator 118 retrieves information from mapping 234.

As further shown by FIG. 4, based upon the received data block 212 and the information in mappings 230, 232 and 234, comparator 118 generates and provides to customer 112 (or a third-party intermediary or broker) a guidance 240 which customer 112 (or the third-party intermediary or broker) uses to determine whether one or more of service providers 114, 116 are suitable or to determine whether the customer should be notified of policy enforcement or control deficiencies that may exist. In one implementation, guidance 240 may comprise an electronic computer readable file or electronic signals. In one implementation, guidance 240 indicates for each data set D what virtual environments E and/or what service providers 114, 116 satisfy the policies defined for the particular data set D. In another implementation, guidance 240 may provide a listing of virtual environments or service providers which best satisfy the policy requirements for each data set, including those virtual environments or service providers that satisfy the policy requirements as well as the virtual environments or service providers that may not completely satisfied all of the policy requirements.

In yet another implementation, guidance 240 may indicate that no current service provider virtual environment satisfies the policy requirements for a particular data set D. In such a situation, the particular data set D may not be transmitted to any of the service providers, the customer 112 may be asked to give permission for a transfer before such date is transmitted or the service provider may be given the opportunity to create or subcontract a new virtual environment capable of satisfying the policy requirements for a particular data set. For example, where neither service provider 114 or service provider 116 presently offers a virtual environment having controls for satisfying the policy defined for the data set, such as policy P2 for data set D2, the service provider 116 may be provided with an opportunity to subcontract the use of virtual environment 208 from subcontractor 117.

Figure 6:
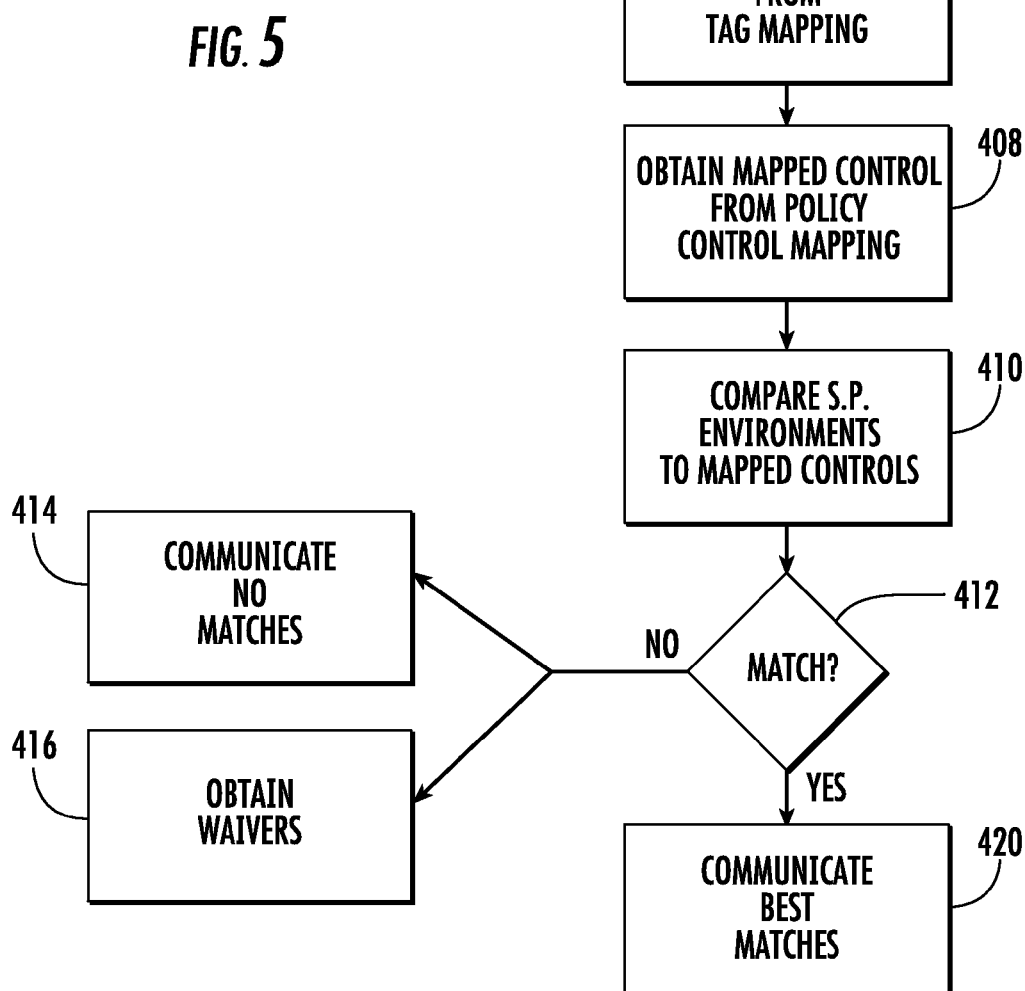
FIG. 6 is a flow diagram of a method for managing the data according to an example implementation.

FIG. 6 illustrates a flow diagram of a process or method 400 which may be carried out by the one or more processing units of comparator 118. As indicated by block 402, comparator 118 receives the data sets D and their associated metadata including policies P or policy tags PT. As indicated by block or step 404, comparator 118 receives or retrieves information regarding available controls C in one or more virtual environments offered by service providers 114, 116. Acquisition of such information regarding available controls C may take place after or prior to the receipt of data sets and metadata in step 402.

As indicated by step or block 406, comparator 118 further obtains policies corresponding to policy tags. In one implementation, comparator 118 may have a prestored lookup table from which comparator 118 retrieves the policies associated with any policy tags in the received data sets. In another implementation, comparator 118 may retrieve from an external source just those policies corresponding to the specific policy tags of the received data sets. In such an implementation, comparator 118 may store the retrieved policy and policy tag associations for subsequent use with later received data sets.

As indicated by step or block 408, comparator 118 obtains mapped controls from policy to control mapping. In other words, comparator 118 consults mapping 234 to identify what controls C are mapped to or satisfy the particular policies P contained or tagged in the metadata that is associated with the data sets received in step 402.

As indicated by step 410, comparator 118 compares the controls offered in the various service provider virtual environments to the controls that will satisfy those policies set forth in the metadata that was received in step 402. As indicated by step or decision point 412, if none of the virtual environments E offered by the current available service providers 114, 116 satisfy the policies identified or tagged in the metadata, comparator 118 either (A) communicates that no current virtual environment has controls for satisfying the requested policies per step 414 or (B) obtains waivers or permissions from the data owner to proceed with the transmission of the one or more data sets and associated metadata to one or more virtual environments despite lack of complete compliance with the requested policies per step 416. In those circumstances where no existing virtual environment have controls which satisfy the desired policies for the data being transmitted, comparator 118 may additionally communicate or request one or more of the service providers to create or subcontract a new virtual environment having controls which would satisfy the desired management policies for the data. In those instances where new virtual environments are created with controls to address the defined policies for the data set, step 410 may be recursively carried out once again to ensure compliance.

In some implementations, the policies P may be cryptographically bound to the associated data set D so that the data sets may not be usable unless such policies are satisfied. For example, identifier based encryption may use the policy P as an encryption key. The data owner 112 may then use a third party trusted by the owner 112 to check that the policy is satisfied before issuing the decryption key.

As indicated by block or step 420, if one or more of the virtual environments E offered by one or more of the potential service providers has controls that will satisfy the desired data management policies for the data being transmitted, comparator 118 provides guidance by communicating those virtual environments that completely satisfy or satisfactorily comply to a predefined extent those data management policies for the data being transmitted.

In implementations where comparator 118 may be at least partially embodied in a virtual machine, comparator 118 would perform each of the above described operations. In one such implementation, the virtual machine providing comparator 118 is combined with an associated data set D as a virtual machine-data image which may be transmitted as a mobile agent similar to the transmission of mobile agent 20 described above with respect to the implementation shown in FIG. 1. In one implementation, the data set itself may be encrypted. In another implementation, both the data set and the virtual machine providing comparator 118 may be encrypted. Each of data sets D may be subsequently transferred or transmitted to service provider 114 or 116 as part of a mobile agent which includes comparator 18 as a virtual machine. Because the virtual machine serving as comparator 118 and the associate data set are encapsulated together as a single mobile agent, comparator 118 is transmitted with the associated data set and is able to operate under multiple platforms to consistently compare and determine if a particular service provider is capable of implementing the controls for satisfying the policies associated with the data sets.

Although the present disclosure has been described with reference to example implementations, workers skilled in the art will recognize that changes may be made in form and detail without departing from the spirit and scope of this disclosure. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A method comprising:
   encrypting data;
   managing the encrypted data using a virtual machine;
   storing the encrypted data and a virtual machine together as a virtual machine-data image, wherein the virtual machine is configured to exert management control over the encrypted data based on policies set by an owner of the data;
   transferring the virtual machine-data image as a mobile agent from a first web-based service provider to a second web-based service provider; and
   controlling usage or movement of the data at the second web-based service provider using the virtual machine of the machine-data image; and
   encrypting the virtual machine, wherein the virtual machine is stored as part of the virtual machine-data image, wherein the virtual machine is configured to determine whether the virtual machine is running in a trusted environment and wherein the virtual machine is configured to contact a source of the data and obtain permission to decrypt the data or allow access to the data if the virtual machine is not running in a trusted environment.

2. The method of claim 1, wherein the virtual machine is configured to provide a file server interface that facilitates booting up of the virtual machine in a plurality of different service provider or customer environments.

3. The method of claim 1, wherein the virtual machine is configured to maintain keys to decrypt the data.

4. The method of claim 1, wherein the virtual machine is configured to manage access policies, authentication and audit logs.

5. The method of claim 1, further comprising metadata associated with the data, the metadata being configured to define policies for usage and movement of the data.

6. The method of claim 5 further comprising comparing capabilities of a service provider and policies set forth in the metadata to determine whether the service provider is capable of satisfying the policies.

7. An apparatus comprising:
a persistent memory storage device;
a virtual image stored on the persistent memory storage device, the virtual image comprising:
encrypted data;
a virtual machine configured to exert management control over the encrypted data based on policies set by an owner of the data, wherein the virtual machine is encrypted and stored as part of the virtual machine-data image, wherein the virtual machine is configured to determine whether the virtual machine is running in a trusted environment and wherein the virtual machine is configured to contact a source of the data and obtain permission to decrypt the data or allow access to the data if the virtual machine is not running in a trusted environment; and
metadata associated with the data, the metadata being configured to define policies for usage and movement of the data, wherein the virtual machine is configured to compare capabilities of a service provider and policies set forth in the metadata to determine whether the service provider is capable of satisfying the policies.

8. The apparatus of claim 7, wherein the management software is configured to provide a file server interface that facilitates booting up of the virtual machine in a plurality of different service provider or customer environments.

9. The apparatus of claim 7, wherein the virtual machine is configured to manage access policies, authentication and audit logs for the encrypted data.

10. The apparatus of claim 7, wherein the virtual machine is encrypted.

11. The apparatus of claim 7, wherein the virtual machine is configured to maintain keys to decrypt the data.

12. An apparatus comprising:
a persistent memory storage device;
a virtual image stored on the persistent memory storage device, the virtual image comprising:
encrypted data; and
a virtual machine configured to exert management control over the encrypted data based on policies set by an owner of the data, wherein the virtual machine is encrypted and stored as part of the virtual machine-data image, wherein the virtual machine is configured to determine whether the virtual machine is running in a trusted environment and wherein the virtual machine is configured to contact a source of the data and obtain permission to decrypt the data or allow access to the data if the virtual machine is not running in a trusted environment.

\* \* \* \* \*